June 14, 1938.  F. C. HENNEKE ET AL  2,120,329
PINKING MACHINE
Filed Aug. 1, 1936  3 Sheets-Sheet 2
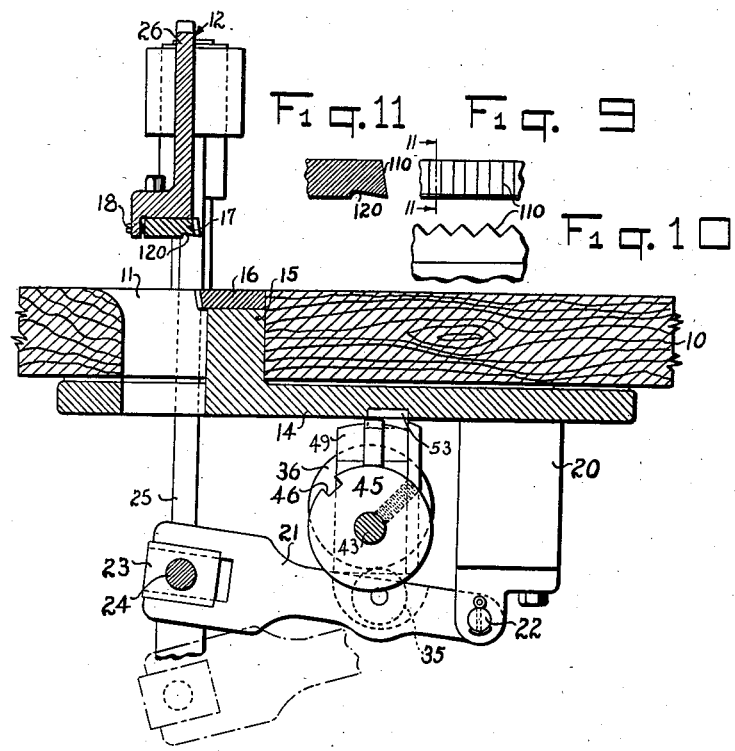
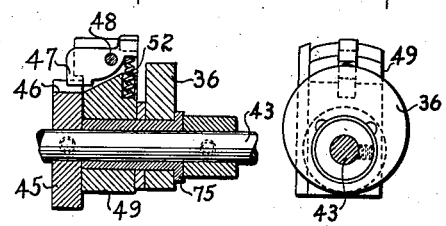
INVENTORS.
Frederick C. Henneke, Adam Berk.
BY Jesse A. Holton
ATTORNEY.

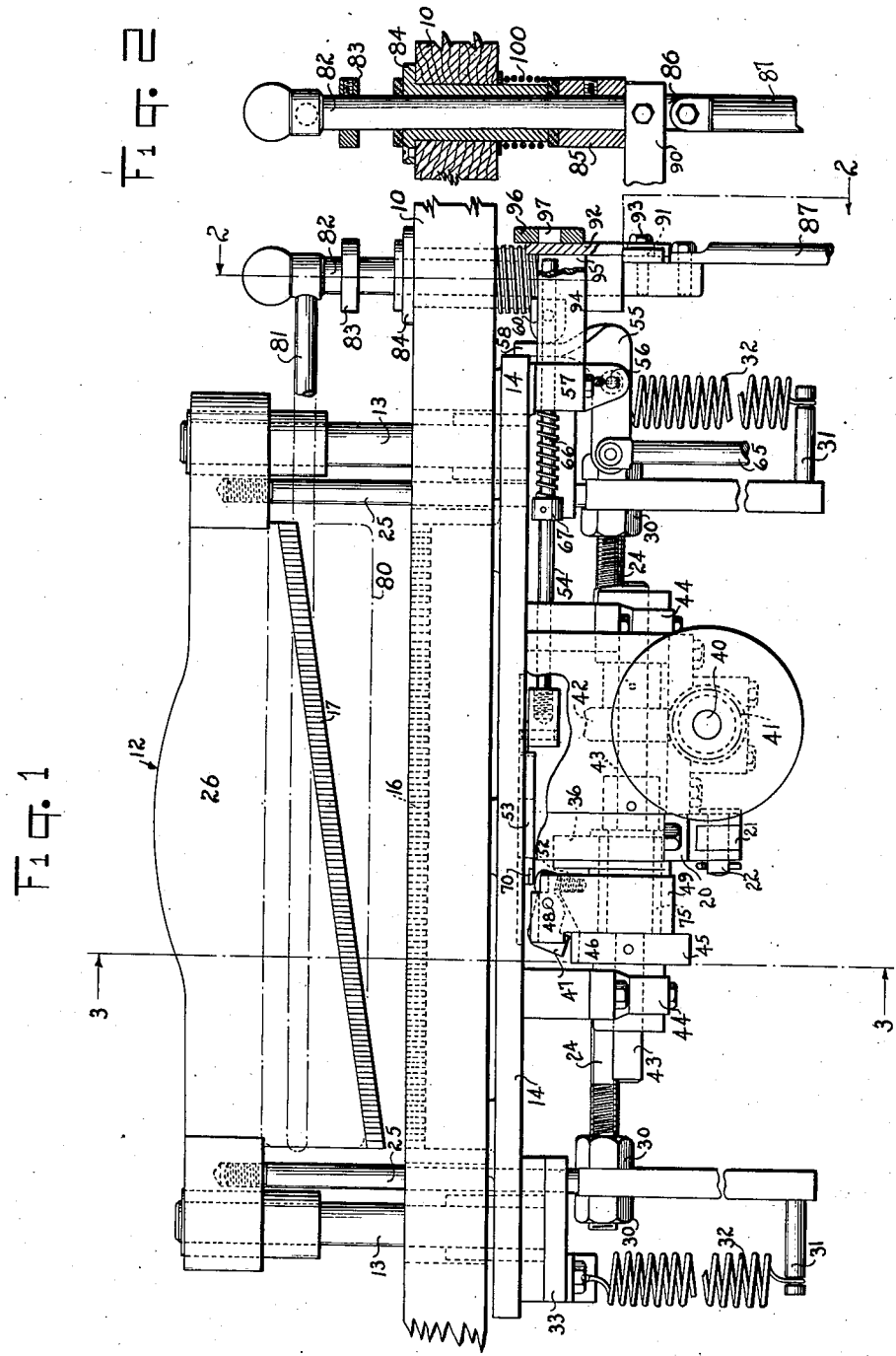

June 14, 1938.  F. C. HENNEKE ET AL  2,120,329
PINKING MACHINE
Filed Aug. 1, 1936  3 Sheets-Sheet 3

INVENTORS.
Frederick C. Henneke, Adam Berk
BY
Jesse A. Holton
ATTORNEY

Patented June 14, 1938

2,120,329

UNITED STATES PATENT OFFICE 2,120,329

PINKING MACHINE

Frederick C. Henneke, Richmond Hill, and
Adam Berk, Ridgewood, N. Y.

Application August 1, 1936, Serial No. 93,862

6 Claims. (Cl. 164—50)

This invention relates to pinking machines, and, in regard to certain more specific features thereof, to power-driven cloth-pinking machines.

It is an object of the invention to provide a simple, reliably operative machine for such purpose which may be operated by relatively unskilled operators and which shall be inexpensive to manufacture and maintain in excellent working condition.

Machines have been devised previously for the purpose of cutting cloth or pelts with a zig-zag or saw-tooth edge, but great difficulty has been encountered in obtaining satisfactory operation of such machines, particularly over any reasonable period of time. Unevenness of cut, tearing of the material, and stoppage of the machine from the lodging between the cutters of ravelings from the cloth or hairs from the pelt, have been notoriously characteristic of such prior attempts.

To avoid these objections much experimentation has been carried on over a period of years. Eventually it came to be believed that a scissors action of the cutting blades was essential to satisfactory operation, but this has necessitated a special cutting of every tooth in at least one cutter if not both. With respect to the movable cutter in prior scissors-action devices, each tooth had to be carefully shaped with a different angularity. The expense of making the cutters to such requirements is entirely disproportionate to the price obtainable for a power-driven machine for pinking cloth, and in maintenance of cutting edge correspondingly expensive operations are necessary.

The present invention discounts the scissors principle of operation and embodies a principle which is believed to be entirely new in this art.

Generally speaking, the invention consists of a work table having a substantially fixed V-toothed cutter or blade and a rectilinearly reciprocatory cutter having teeth interfitting with the fixed cutter, which teeth are uniformly shaped to parallel the direction of movement of the cutter. The movable cutter is set at a substantial angle to the table and to the fixed cutter, and this relative angle is maintained as the movable cutter is passed in shearing across the fixed cutter. Thus the shearing action of the individual teeth is progressive, meeting and overcoming the resistance of the work tooth-by-tooth as in scissors cutting but eliminating the great expense of cutting each tooth with a different angularity.

It is recognized that angularly disposed cooperative toothed-cutters have been previously designed for use in metal plate cutting but a vastly different problem is present in the cutting of cloth, particularly thick woolen and worsted cloth, owing to the lack of resistance in such materials and the tendency of the fibres to separate and jam the machine. To overcome such difficulties in a reliably operative and inexpensive machine is an aim of the present invention.

In the accompanying drawings there is shown one of various possible embodiments of the invention.

Fig. 1 is a view in front elevation of a pinking machine embodying the invention.

Fig. 2 is a sectional view taken on the line 2—2 of Fig. 1.

Fig. 3 is a view in transverse section taken substantially along the line 3—3 of Fig. 1.

Figs. 4—5 are detailed views of the clutch mechanism.

Figure 6:
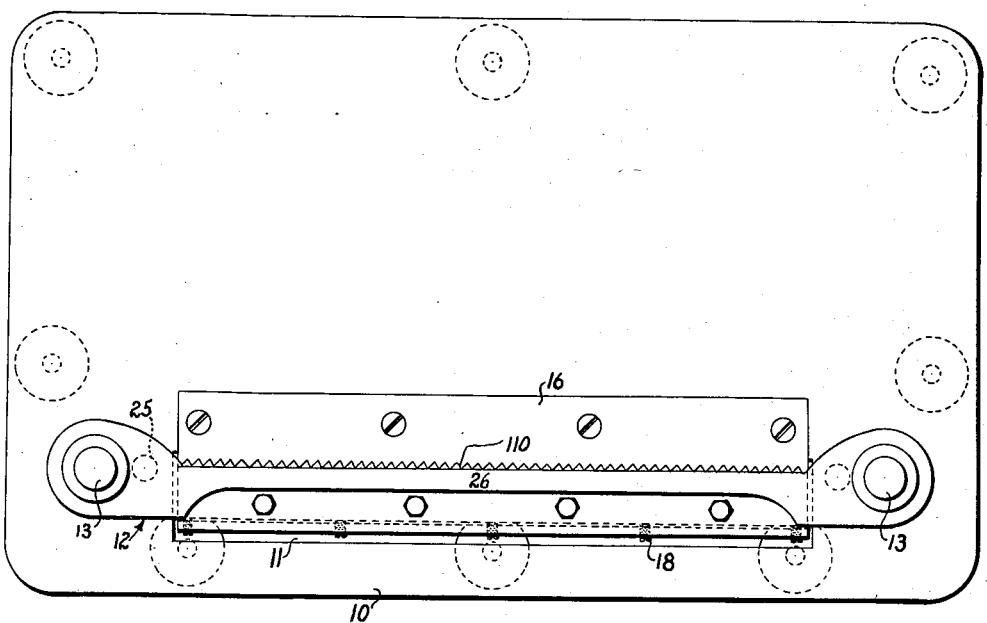

Fig. 6 is a top plan view of the cutting mechanism of the machine shown in Fig. 1.

Figure 7:
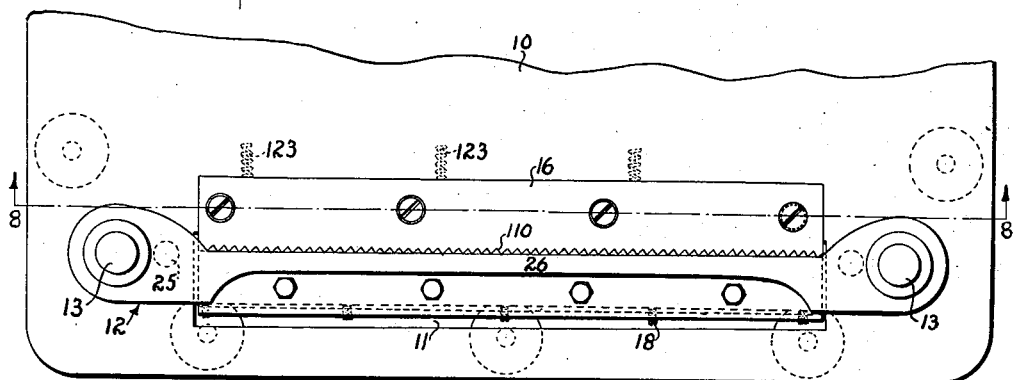

Fig. 7 is a top plan view of a modified mounting for the stationary cutter.

Figure 8:
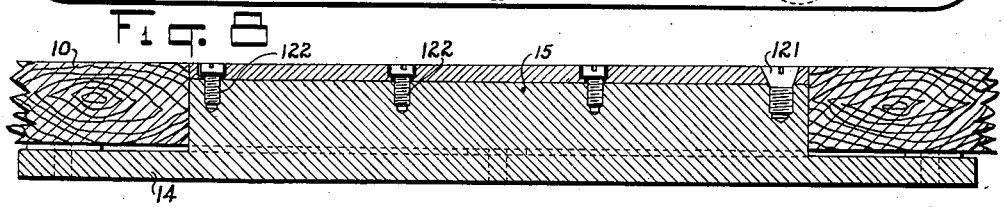

Fig. 8 is a sectional view taken on the line 8—8 of Fig. 7.

Figs. 9—10 are respectively a front elevation view and a bottom plan view of the movable or reciprocatory knife.

Fig. 11 is a sectional view taken on the line 11—11 of Fig. 9.

Referring now more particularly to the drawings a table-top 10 is supported in conventional manner by legs or uprights (not shown) and this table-top is apertured at 11 to allow for the passage of a reciprocatory shear or cutter 12 which has a sliding mounting at either end on posts 13 which rise from a metal bed-plate 14 fitted to the under side of the table-top 10 and having an upwardly projecting rib 15 which enters the aperture 11 and supports a knife 16 which may be considered, for the purposes of this case, as the fixed or stationary cutter with its upper surface flush with the upper surface of the table-top 10. The reciprocatory cutter 12 has a knife 17 fixed at its lower end, and it is provided with means indicated at 18 for making slight lateral adjustments.

Actuating means for the reciprocatory cutter comprises a depending bracket 20 having an arm 21 pivotally mounted thereon, as indicated at 22, and said arm 21 is slotted to receive a sliding block 23 through which passes a shaft 24 which has connections at either end with rods 25, the upper ends of which are threaded into the cross bar 26 of the reciprocatory cutter 12. The connections between the shaft 24 and rods 25 are indicated at 30 and the rods are squared from these connections downwardly and carry pins 31 from which coiled springs 32 connect to fixed brackets 33 on the bed-plate 14. The arm 21 carries a roller 35 which is acted upon by an eccentric 36 to swing the arm about the pivot 22 and move it downwardly in opposition to the springs 32, which latter return the arm as the eccentric rides to its low point. Thus for each rotation of the eccentric 36 the knife 17 passes across the knife 16, enters the aperture 11 and returns to its upper position shown in Fig. 3.

A motor-driven drive shaft 40 rotates a worm 41 which meshes with a worm wheel 42 fast on a shaft 43, the latter being mounted in bearing brackets 44 depending from the bed-plate 14. The shaft 43 has fixed to it a clutch disc 45 notched at 46 to engage a pivoted dog 47 pivoted at 48 in a rotatable clutch member 49 which is united with the eccentric 36. The engaging end of the dog 47 is urged against the periphery of disc 46 by a spring 52 and may enter the notch 46 when a slide 53 is withdrawn from the dog.

The slide 53 is operated by a rod 54 and a bell-crank lever 55 pivoted at 56 on a bracket 57 depending from the bed-plate 14. An upper arm 58 of the bell-crank lever acts against a block 60 on the end of rod 54 when a thrust rod 65 is raised from a suitable treadle, not shown. When pressure is released from the treadle a coiled spring 66, bearing against a collar 67 on the rod and reacting against bracket 57, urges the slide forwardly until a lug 70 cams the dog 47 and disengages it from the notch 46 in disc 45. The clutch member 49 is loosely mounted on a sleeve 75 on the shaft 43. When it is desired to reciprocate the cutter 12, the treadle is actuated to retract rod 54 and slide 53, allowing spring 55 to act upon the pivoted dog and press it against the periphery of disc 45. When the disc in its rotation presents its notch 46 opposite the dog, the engaging end of the dog enters the notch and the clutch member 49 and its eccentric 36 are rotated with shaft 43. The treadle being released, slide 53 is returned by spring 66 so that at the end of one rotation of shaft 43 and disc 45 the latch will be disengaged by rotative engagement with the lug 70.

In order to prevent injury to the operator a safety-guard mechanism is employed, comprising a guard-plate 80, shown in dot-and-dash lines in Fig. 1 of the drawings. This plate is mounted on a rod 81 which is carried on a post 82 having a collar 83 secured thereto. The post passes through a bushing 84 in the table-top 10 and has a collar 85 secured in position near its lower end. The extreme lower end of the post 82 is flattened as indicated at 86 and has connected thereto an operating rod 87. Also connected to the lower end of post 82 is a transverse bar 90 grooved as indicated at 91 to receive an upwardly extending flat bar 92 secured in position by a bolt 93. A box comprising a front wall 94, a rear wall 95, and a side wall 96 is suitably secured to the bed-plate 14, and the side wall 96 is provided with an opening 97 adapted normally to allow passage of the end of rod 54. When the bar 92 is in its elevated position, the opening 97 is blocked and consequently the treadle may not be operated to retract the rod 54 and slide 53 and release the clutch dog to engaging position. It is, therefore, necessary that post 82 be in its downward position, which brings the guard-plate 80 down in front of the cutter before the actuating mechanism for the reciprocatory cutter can be set in operation. A coil spring 100 tends to force the post 82 to its lowermost position, bringing the guard-plate down into safety position. The post 82 may be released to the action of spring 100, when the treadle is operated and restored to its upper position by a conventional treadle spring of greater strength than the spring 100.

The invention in this case resides in major part in the location and arrangement of the cutters, the character of the cutting action, and the shape of the cutting teeth of the cooperative knives. It is to be noted that one cutter, which in this preferred form is the stationary cutter, is arranged horizontally with its upper surface flush with the upper surface of the table-top and that the movable cutter is mounted for rectilinear reciprocatory movement at right angles to the stationary cutter and carries a knife which is at a substantial angle to the horizontal. For pinking material it is necessary that the cutter be formed with teeth, preferably pointed teeth, and according to this invention these teeth indicated at 110 are cut parallel to the rectilinear movement of the reciprocatory cutter. This is true both in the movable knife and in the fixed knife. Thus, in operation of the device there is the condition of the lowermost tooth of the movable knife entering first into engagement with the companion tooth of the stationary cutter and effecting its shearing operation closely followed by the second, third and fourth, and each successive tooth of the movable cutter engaging companion teeth in the fixed cutter. It will be apparent, therefore, that only a very small section of the two knives are actually in cutting engagement at any one period and that the effect of a shear cutter is obtained without, however, necessitating the varying angularities of teeth which would be necessary with pivoted shearing knives.

In a preferred form of the invention the teeth of both cutters are relieved slightly from the primary cutting edge and it has been found desirable to slightly under-cut the movable knife as indicated at 120.

In the modified form of the invention shown in Figs. 7 and 8 of the drawings, the so-called stationary shear is permitted a slight pivotal movement around a stud screw 121. To accomplish this the stud screws 122, which are used to locate the knife on the bed-plate rib 15, are not set up against the knife, and the knife is bored to receive the heads of the studs with allowance for slight pivotal movement around the stud 121. Springs 123 are suitably arranged to bear firmly against the knife but permit it to yield slightly as the cutting operation advances.

What is claimed is:

1. In a machine for pinking cloth, a toothed-edge cutter mounted on a table, a co-acting toothed-edge cutter mounted to be rectilinearly movable to pass its teeth successively into engagement with successive teeth in the first said cutter, the teeth of each cutter being uniformly parallel to the direction of movement of the movable cutter, being relieved from the cutting edge away from the line of primary engagement between the teeth of the cutters, and the teeth of at least one cutter being relieved from the cutting plane, and driving means for reciprocating the co-acting toothed-edge cutter, comprising an electric motor, a clutch, means for engaging the clutch, a rocker arm, connections from the rocker arm to the rectilinearly movable cutter, cam means operated by said motor through said clutch to engage the cutters, and spring means opposing the action of said cam means.

2. In a machine for pinking cloth, a toothed-edge cutter mounted for slight pivotal yield on a table, and a co-acting toothed-edge cutter mounted to be rectilinearly movable to pass its teeth successively into engagement with successive teeth in the first said cutter and in doing so cause said pivotal yield of the first said cutter.

3. In a machine for pinking cloth, a toothed-edge cutter mounted on a table, a co-acting toothed-edge cutter mounted to be rectilinearly movable to pass its teeth successively into engagement with successive teeth in the first said cutter, the mounting of the first said cutter including a pivot at the region of primary engagement, and spring means opposing said pivotal movement during the period of successive tooth engagement.

4. In a machine for pinking cloth, a table, a toothed cutter mounted on said table, another toothed cutter angularly disposed and adapted for rectilinear reciprocatory movement past the first said cutter for shearing, the first said cutter being mounted with provision for slight yield progressively as it is passed in shearing by successive teeth of the other cutter.

5. In a machine for pinking cloth, a table, a toothed cutter mounted on said table, another cutter with teeth fitting the teeth of the first said cutter, angularly disposed to the first said cutter and adapted for rectilinear reciprocatory movement past the first said cutter for shearing, one of said cutters having a resilient mounting adapting it for slight yield under pressure from the progressive engagement of the other cutter.

6. In a machine for pinking cloth, a toothed-edge cutter, an intermittently reciprocatory toothed-edge cutter mounted to be rectilinearly movable to pass its teeth successively into engagement with successive teeth of the first said cutter, the teeth of each cutter being uniformly parallel to the direction of rectilinear movement and the teeth of one cutter being relieved from the cutting edge, and means yieldingly mounting one of said cutters to adapt it for slight movement as teeth of the other cutter successively engage it.

FREDERICK C. HENNEKE.
ADAM BERK.